United States Patent
Chung et al.

(10) Patent No.: US 7,842,186 B2
(45) Date of Patent: Nov. 30, 2010

(54) METHOD OF REMOVING PHOSPHORUS AND/OR NITROGEN

(75) Inventors: In Chung, Seoul (KR); Chi-Don Sung, Seoul (KR)

(73) Assignee: Entechs Co., Seoul (KR)

( * ) Notice: Subject to any disclaimer, the term of this patent is extended or adjusted under 35 U.S.C. 154(b) by 0 days.

(21) Appl. No.: 12/296,552

(22) PCT Filed: Mar. 7, 2008

(86) PCT No.: PCT/KR2008/001309

§ 371 (c)(1),
(2), (4) Date: Oct. 9, 2008

(87) PCT Pub. No.: WO2008/108599

PCT Pub. Date: Sep. 12, 2008

(65) Prior Publication Data

US 2009/0308807 A1    Dec. 17, 2009

(30) Foreign Application Priority Data

Mar. 8, 2007    (KR) .................. 10-2007-0022701
Dec. 21, 2007   (KR) .................. 10-2007-0135309

(51) Int. Cl.
*C02F 3/28*     (2006.01)
*C02F 11/04*    (2006.01)

(52) U.S. Cl. .................. 210/603; 210/615; 210/617; 210/631; 210/903; 210/906

(58) Field of Classification Search .................. 210/603, 210/615, 616, 617, 631, 903, 906; 435/262, 435/262.5

See application file for complete search history.

(56) References Cited

U.S. PATENT DOCUMENTS 5,798,043 A  *  8/1998  Khudenko .................. 210/603
6,838,569 B2    1/2005  Sharma et al.

(Continued)

FOREIGN PATENT DOCUMENTS

DE    3307796 A1  *  9/1984

(Continued)

OTHER PUBLICATIONS

International Search Report and Written Opinion dated Apr. 21, 2008. PCT/KR2008/001309.

*Primary Examiner*—Fred Prince
(74) *Attorney, Agent, or Firm*—Gifford, Krass, Sprinkle, Anderson & Citkowski, P.C.

(57) ABSTRACT

The present invention provides a method of treating wastewater containing phosphorus and/or nitrogen for removing phosphorus and/or nitrogen from the wastewater, including following steps of: (a) introducing wastewater containing phosphorus and/or nitrogen into a an anaerobic reactor, treating the introduced wastewater with anaerobic microorganisms, to produce biogas from organic matters in the wastewater, and then discharging the treated wastewater saturated with carbon dioxide under carbon dioxide partial pressure of 0.2 to 0.5 atm; and (b) injecting the treated wastewater of step (a) into a carbon dioxide stripping apparatus wherein the wastewater is free-fallen to expose the wastewater to ambient condition with carbon dioxide partial pressure of less than 0.001 atm so that carbon dioxide stripping takes place and increase in pH occurs without addition of alkaline substance, and then providing proper pH of 8.4 to 9.6 to form struvite.

15 Claims, 2 Drawing Sheets

U.S. PATENT DOCUMENTS

| | | |
|---|---|---|
| 7,087,170 B2 | 8/2006 | You et al. |
| 7,135,116 B2 | 11/2006 | Haggerty et al. |
| 7,182,872 B2 | 2/2007 | Barak et al. |
| 7,435,349 B2 * | 10/2008 | You et al. ................... 210/605 |

FOREIGN PATENT DOCUMENTS

| | | |
|---|---|---|
| KR | 1020000042499 A | 7/2000 |
| KR | 2006-0125981 | 12/2006 |

\* cited by examiner

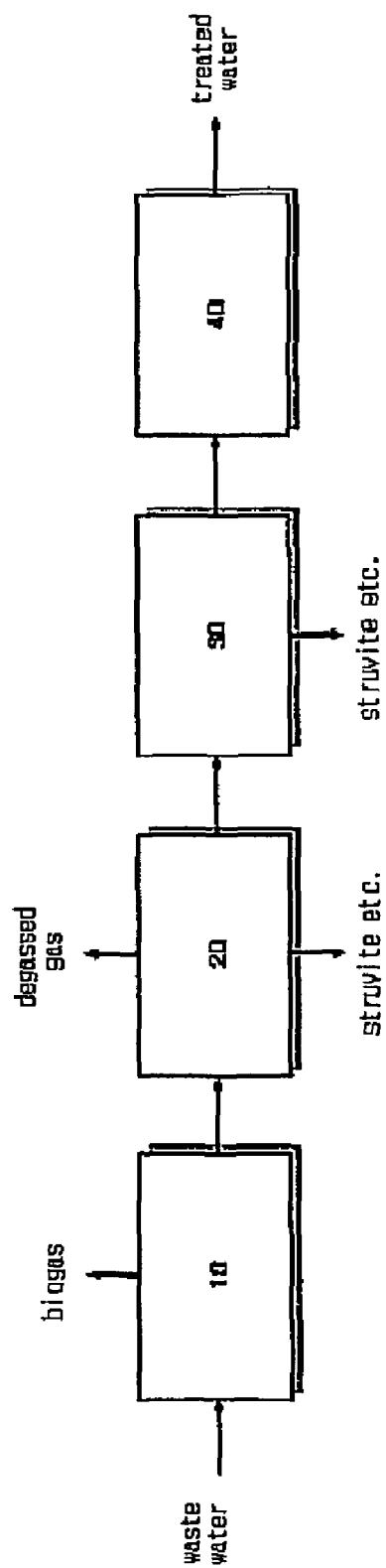
[FIG. 1]

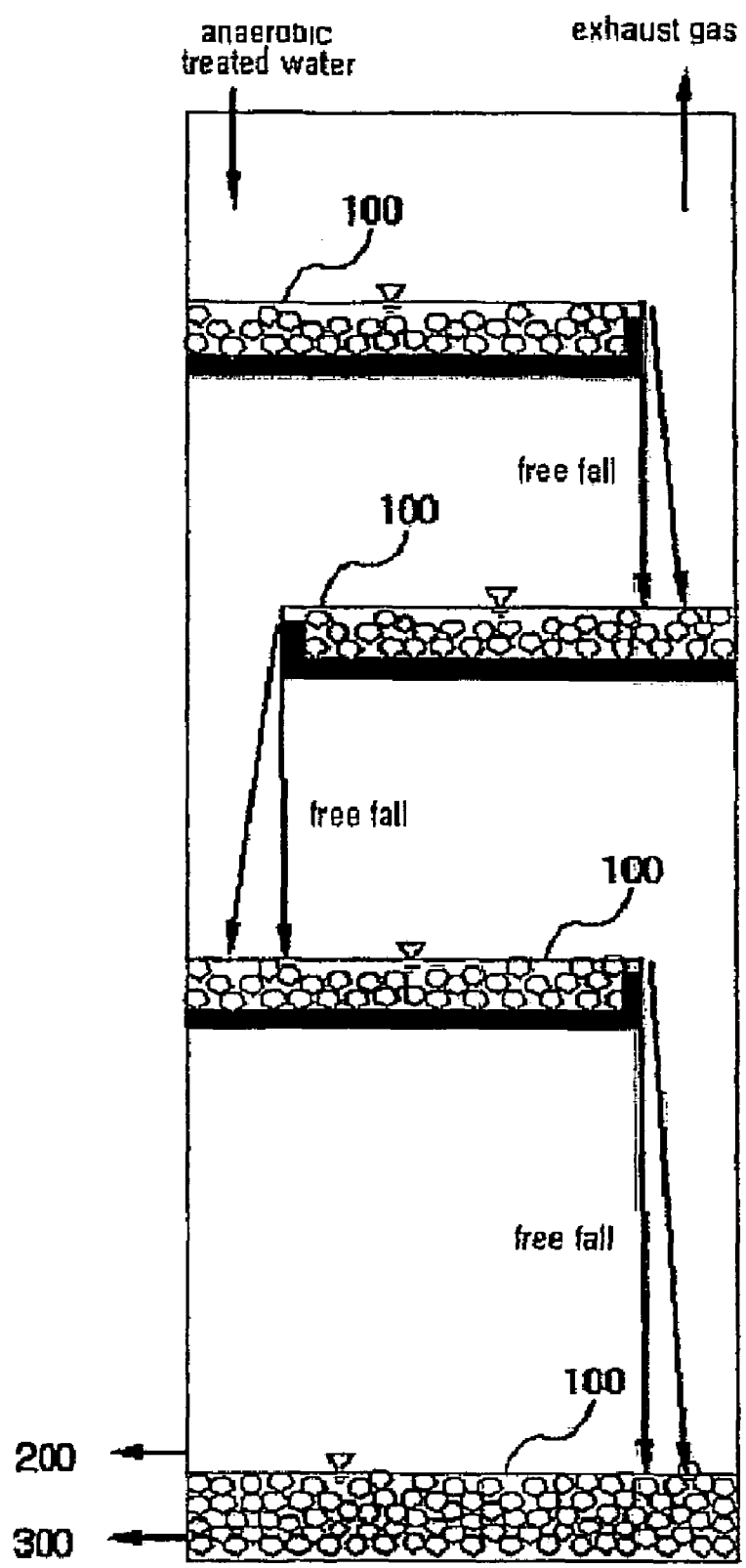
[FIG. 2]

METHOD OF REMOVING PHOSPHORUS AND/OR NITROGEN

CROSS-REFERENCE TO RELATED APPLICATIONS

This application is the U.S. national phase of PCT/KR2008/001309 filed Mar. 7, 2008, which claims priority of Korean Patent Application No. 10-2007-0022701 filed Mar. 8, 2007 and Korean Patent Application No. 10-2007-0135309 filed Dec. 21, 2007.

This application claims priority to and the benefit of Korean Patent Application No. 10-2007-002270 filed on Mar. 8, 2007 and Korean Patent Application No. 10-2007-0135309 filed on Dec. 21, 2007, which is hereby incorporated by reference for all purposes as if fully set forth herein.

BACKGROUND OF THE INVENTION (a) Field of the Invention

The present invention provides a method of removing phosphorus and/or nitrogen. More specifically, the present invention provides an efficient and economical method of selectively or simultaneously removing phosphorus and/or nitrogen from wastewater containing phosphorus and/or nitrogen through struvite crystallization.

(b) Description of the Related Art

There are many existing biological and physical-chemical methods for removing phosphorus and nitrogen and these methods have drawbacks such as difficulties in maintaining the removal efficiency while being costly as well.

Recently, the research of simultaneous removal of nitrogen and phosphorus through production of struvite (magnesium ammonium phosphate, MAP) has been actively pursued. Pure MAP is composed of magnesium ion, ammonium nitrogen, and phosphate in a mole ratio of 1:1:1, reciprocally. However, existing studies show that there are many side reactions and such side reactions cause the mole ratio exhibiting a maximum nitrogen elimination to vary as the likes of 3:1:1.5. The reaction formula is:

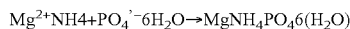

Additionally, struvite analogs such as Calcium Ammonium Phosphate, in which magnesium ion is substituted by calcium ion, may be produced. As a matter of fact, a knowledgeable amount of phosphorus and/or nitrogen is removed in the form of struvite analogs as well as struvite, but recognition of struvite analogs is absent in many struvite related researches. In this invention, the category 'struvite' includes struvite analogs along with struvite.

Removal of phosphorus and nitrogen from wastewater by the form of struvite and struvite analogs can effectively eliminate phosphorus and nitrogen simultaneously. It also has the advantage of producing struvite that can be sold as a slow-release fertilizer.

The term 'slow-release fertilizer' refers to a fertilizer that is non-toxic and has a lasting effect without being easily oxidized over a long period of usage.

The researches for various struvite crystallization methods have been performed internationally. These include:

S. Regy et al., *Phosphate recovery by struvite precipitation in a stirred reactor* (March to December 2001)

Ueno and Fujii, *Three years experience on operating and selling recovered struvite from full scale plant* (2001)

E. V. Munch et al., *Making a business from struvite crystallization for wastewater treatment: turning waste into gold* (2001)

S. A. Parsons et al., *Assessing the potential for struvite recovery at sewage treatment works* (2001)

Trentelman, U.S. Pat. No. 4,389,317

Tsunekawa et al., Abstracts of Japanese Patent No. 11-267665

Many methods to remove phosphorus and/or nitrogen in struvite form have been developed and most of them need addition of an alkaline substance to increase the pH.

Many researchers have reported that the appropriate pH for MAP formation is from 8 to 10. The optimum pH is reported as 9.0 to 9.2. However, most of the developed MAP producing technologies use alkaline substances to increase the pH, but fail to achieve a pH higher than that of 9, due to high expenses of NaOH addition. On top of that, maintaining a fluidized bed is required in order to increase the size of crystals.

SUMMARY OF THE INVENTION

The object of the present invention is to provide an efficient and economical method of selectively or simultaneously removing phosphorus and/or nitrogen from wastewater containing phosphorus and/or nitrogen through struvite crystallization.

To achieve the object, the present invention provides a method of crystallizing struvite, including the steps of:

(a) introducing wastewater containing phosphorus and/or nitrogen into an anaerobic reactor, treating the introduced wastewater with anaerobic microorganisms, to produce biogas from organic matters in the wastewater, and then discharging the treated wastewater saturated with carbon dioxide under carbon dioxide partial pressure of 0.2 to 0.5 atm, preferably 0.25 to 0.5 atm; and (b) introducing the treated wastewater of step (a) into a carbon dioxide stripping apparatus wherein the wastewater is free-fallen to expose the wastewater to ambient condition with carbon dioxide partial pressure of less than 0.001 atm so that carbon dioxide stripping takes place and increase in pH occurs without addition of alkaline substance, and then providing proper pH of 8.4 to 9.6 to form struvite.

In another aspect, the present invention provides a method of treating wastewater containing phosphorus and/or nitrogen for removing phosphorus and/or nitrogen from the wastewater, including following steps of:

(a) introducing wastewater containing phosphorus and/or nitrogen into an anaerobic reactor, treating the introduced wastewater with anaerobic microorganisms, to produce biogas from organic matters in the wastewater, and then discharging the treated wastewater saturated with carbon dioxide under carbon dioxide partial pressure of 0.2 to 0.5 atm, preferably 0.25 to 0.5 atm; and (b) introducing the treated wastewater of step (a) into a carbon dioxide stripping apparatus wherein the wastewater is free-fallen to expose the wastewater to ambient condition with carbon dioxide partial pressure of less than 0.001 atm so that carbon dioxide stripping takes place and increase in pH occurs without addition of alkaline substance, and then providing proper pH of 8.4 to 9.6 to form struvite.

The method of treating wastewater may further comprise the following steps of;

(c) separating and collecting struvite from the wastewater of step (b) while discharging the wastewater through a solids separating arrangement; and/or (d) storing the wastewater of step (c) for usage as liquid fertilizer and/or additionally treating the wastewater of step (c) for discharge.

BRIEF DESCRIPTION OF THE DRAWINGS

FIG. 1 shows a flow chart representing the composition of the invention.

FIG. 2 shows an embodiment using carbon dioxide stripping arrangement that extricates carbon dioxide during free fall.

DESCRIPTION OF THE REFERENCE NUMBERS USED IN THE DRAWINGS

| | |
|---|---|
| 10: anaerobic wastewater processing step | |
| 20: struvite formation step | 30: struvite separation step |
| 40: storage of processed water | 100: filter medium |
| 200: storage of processed water | 300: storage for struvite |

DETAILED DESCRIPTION OF THE PREFERRED EMBODIMENTS

A more complete appreciation of the invention, and many of the attendant advantages thereof, will be readily apparent as the same becomes better understood by reference to the following detailed description.

The present invention provides a struvite crystallization method including the steps of:

(a) introducing wastewater containing phosphorus and/or nitrogen into an anaerobic reactor, treating the introduced wastewater with anaerobic microorganisms, to produce biogas from organic matters in the wastewater, and then discharging the treated wastewater saturated with carbon dioxide under carbon dioxide partial pressure of 0.2 to 0.5 atm, preferably 0.25 to 0.5 atm; and (b) introducing the treated wastewater of step (a) into a carbon dioxide stripping apparatus wherein the wastewater is free-fallen to expose the wastewater to ambient condition with carbon dioxide partial pressure of less than 0.001 atm so that carbon dioxide stripping takes place and increase in pH occurs without addition of alkaline substance, and then providing proper pH of 8.4 to 9.6 to form struvite.

In another aspect, the present invention provides a method of treating wastewater containing phosphorus and/or nitrogen for removing phosphorus and/or nitrogen from the wastewater, including following steps of:

(a) introducing wastewater containing phosphorus and/or nitrogen into an anaerobic reactor, treating the introduced wastewater with anaerobic microorganisms, to produce biogas from organic matters in the wastewater, and then discharging the treated wastewater saturated with carbon dioxide under carbon dioxide partial pressure of 0.2 to 0.5 atm, preferably 0.25 to 0.5 atm; and (b) introducing the treated wastewater of step (a) into a carbon dioxide stripping apparatus wherein the wastewater is free-fallen to expose the wastewater to ambient condition with carbon dioxide partial pressure of less than 0.001 atm so that carbon dioxide stripping takes place and increase in pH occurs without addition of alkaline substance, and then providing proper pH of 8.4 to 9.6 to form struvite.

The method of treating wastewater may further comprise the following steps of;

(c) separating and collecting struvite from the wastewater of step (b) while discharging the wastewater through a solids separating arrangement; and/or (d) storing the wastewater of step (c) for usage as liquid fertilizer and/or additionally treating the wastewater of step (c) for discharge.

The present invention is described in detail, as follows.

1. Step (a): Anaerobic Wastewater Processing Step

The wastewater containing phosphorus and/or nitrogen may be introduced into an anaerobic reactor. The organic matters of the introduced wastewater are decomposed by anaerobic microorganisms to be converted into biogas including methane and carbon dioxide. During the decomposition of organic matters, a part of organic nitrogen is converted into ammonium nitrogen.

Unless otherwise specified, the term "wastewater containing phosphorus and/or nitrogen" includes all wastewater containing phosphorus and/or nitrogen such as sewage, livestock waste, industrial waste, food waste, supernatant liquor from food waste, and sewage sludge.

Any of the conventionally operated anaerobic reactors, such as digesters, anaerobic contact processes, anaerobic filters (which use attached microorganisms), fluidized bed reactors (which use floating microorganisms), hybrid anaerobic reactors (which use attached and floating microorganisms together) and UASB (upflow anaerobic sludge blanket) series reactors which use granules, including UASB, EGSB (extended granule sludge bed), IC (internal circulation), and the like, may be used as the anaerobic reactor in the present invention.

Carbon dioxide gas bubbles and methane gas bubbles produced as a result of anaerobic degradation, pass through the water body in the anaerobic reactor and part of carbon dioxide is dissolved in wastewater while 100% of methane gas bubbles reaches the gas phase. For this reason, carbon dioxide content of the biogas is between 25% and 50% and the partial pressure of carbon dioxide is less than 0.5 atm, preferably ranging 0.2 to 0.5 atm. The effluent of the anaerobic reactor is thus saturated with carbon dioxide under the partial pressure of 0.2 to 0.5 atm and usually has a pH of 6.4 to 7.8.

2. Step (b): Struvite Formation Step

The treated wastewater of step (a) is introduced into a carbon dioxide stripping apparatus to degas carbon dioxide. In the apparatus, the wastewater is free fallen at least 2 times so that it is completely dispersed due to the potential energy generated by the free fall. The purpose of this step is to degas the carbon dioxide from the treated water of step (a) to the maximum by exposing the treated water of step (a) that is saturated with carbon dioxide under carbon dioxide partial pressure of 0.2 to 0.5 atm to ambient condition with carbon dioxide partial pressure of less than 0.001 atm so that carbon dioxide stripping takes place.

When the carbon dioxide is stripped from the treated water of step (a), the pH naturally increases up to 8.4 to 9.6 without addition of alkaline substance. This allows efficient struvite formation without adding any alkaline substances. Further, the stripping of ammonia happens as well.

The fact that there is no need to add alkaline substances for increasing the pH indicates how the present invention significantly differs from the existing MAP (struvite) producing methods. One of the most notable characteristics of the present invention is that it cost-efficiently and simultaneously removes phosphorus and nitrogen through MAP production while additionally ridding of extra nitrogen by ammonia stripping. In other words, this invention most economically removes phosphorus and nitrogen compared to any other existing MAP-producing methods.

Additionally, bicarbonate ion is converted to carbonate ion within the increased pH range and as a result, insoluble carbonate salts such as $CaCO_3$, $MgCO_3$, $CuCO_3$, and etc. are formed. The partial crystallization of organic nitrogen and ammonium nitrogen may occur during this process.

Another advantage of the present invention compared to existing struvite crystallization methods is that while existing methods need to remove 100% of the produced struvite in floating form, the present invention removes only 30 to 60% of the produced struvite in floating form, resulting in downsizing the struvite retrieving facility and in saving operating costs. This is done by using the tendency of the struvite and its analogs to easily adhere to some type of surfaces of filter medium. The struvite adheres to filter medium that are appropriately set up on the existing stages for the complete dispersion of water. The occasional retrieval of the filter medium and the removal of small pebble-like struvite from filter medium reduce the amount of suspended struvite that has to be removed latter on.

There may be various carbon dioxide stripping arrangements to naturally increase the pH by stripping the dissolved carbon dioxide from the anaerobically treated water of step (a) during free fall. For example, the treated water of step (a) may can be degassed by putting it through slightly modified facilities designed to make liquid and gas come into contact (such as a scrubber, distillation tower etc. as shown in FIG. 2) or streamed over a stair-like aeration device.

The filter medium used on the carbon dioxide stripping arrangement can be categorized as a simple adhesive filter medium or calcium and/or magnesium ion supplying filter medium. For simple filter medium, there are natural filter medium (sand, pebbles, charcoal etc.) and artificial filter medium (ceramics, PE, PVC etc.). As for calcium and/or magnesium ion supplying filter medium, there are magnesite (which supplies magnesium ion for struvite formation), calcite etc. More than one kind of filter medium can be used in combination as well.

The mole ratio of magnesium, ammonium nitrogen and phosphate required for the production of struvite is $Mg:NH_4:PO_4=1:1:1$. However, the actual required mole ratio is reported to be different from 1:1:1 and 3:1:1.5 is one of the reported values. This is because calcium carbonate and other salts are produced along with struvite. In accordance with this, the necessary type and amount of chemicals (magnesium containing compounds, phosphate containing compounds, and/or ammonium nitrogen) should be determined by considering the type of wastewater in order to minimize side reactions, and the chemicals may be properly supplied in upper/middle/lower compartments of step (b).

Furthermore, calcium containing compounds may be additionally supplied for the formation of struvite analogs depending on the wastewater.

3. Step (c): Struvite Separation Step

This step is to separate and retrieve the suspended solids, such as struvite, struvite analogs, calcium compounds, phosphorous compounds and the like formed by step (b), while allowing the outflow of the processed water without much suspended solids.

Any conventional arrangements, such as a precipitation tank, a flotation tank, a hydrocyclone, a decanter, a screen, a membrane separation and the like, may be used as the solids separating arrangement for struvite separation.

4. Step (d): Storage Step

This step is for storage of the processed water of step (c) for usage as liquid fertilizer and/or additional treatment for discharge. The stored processed water may be used as liquid fertilizer or further treated for discharge after undergoing biological treatment process, chemical treatment process, or other various types of treatment (relevant to the type of pollutes and their concentrations). On the other hand, all or a portion of the processed water of step (c) can be returned to the anaerobic reactor of step (a) to decrease the concentration of toxic substances such as ammonium nitrogen etc. within the inflowing wastewater, this increases the organic removal efficiency of the anaerobic reactor and the production amount of biogas. For example, reducing ammonium nitrogen concentration in an anaerobic reactor for treatment of swine wastewater below 1,000 mg/L can double the biogas production comparing with the case of maintaining ammonium nitrogen concentration of above 3,000 mg/L. By reducing ammonium nitrogen concentration below 2,000 mg/L can increase the biogas production by 30 to 60%.

When there are many suspended solids within the wastewater with phosphorus and/or nitrogen, the addition of a solid eliminating facility before step (a) or in between steps (a) and (b) allows the solids to be separated and discarded or sent back to step (a). When the solids covered with microorganisms are present, it would be beneficial to recycle these solids covered the microorganisms to the anaerobic reactor. The production of biogas is increased because the extra microorganisms decompose more organics into biogas.

By injecting alkaline substances like sodium hydroxide into early/mid/late part of step (b), the pH will increase even more and may result in an increased struvite crystallization rate and/or ammonia stripping.

For the simplicity and convenience of operation, filter medium in step (b) can be removed so that 100% of the crystals formed in step (b) is removed in floating form in step (c).

As a supplier of nitrogen and phosphorus, the retrieved struvite crystals are an effective and valuable slow-release fertilizer.

The present invention is further explained in more detail with reference to the following examples. These examples, however, should not be interpreted as limiting the scope of the present invention in any manner.

EXAMPLE

Example 1

An upflow hybrid anaerobic reactor with a service capacity of 1 m$^3$ and a height of 3 m was used to treat 150 L/d of swine wastewater ridden of suspended solids for the struvite formation experiment. The carbon dioxide stripping apparatus with width of 10 cm, length of 10 cm, and a height of 245 cm has 4 stages to supply 4 times of complete mixing and dispersion. For the probable input of alkaline substance and other chemicals, a chemical supplying line was installed. Filter medium were cut from a polyethylene hose of a 5 mm external diameter for struvite attachment. These were stacked up on each stage of stripping apparatus at a height of 4-6cm. The carbon dioxide stripping was induced by streaming the anaerobic reactor effluent through the stripping tower and allowed to free fall. Separation of floating struvite crystals was done with a precipitation tank with a capacity of 250 L.

The table below shows the results of a continuous operation for a month. The mean value of results were analyzed over 10 points of time. The items were categorized into 'before anaerobic treatment' (suspended solids ridden swine wastewater), 'after anaerobic treatment' (effluent from the anaerobic wastewater processing step), and 'after separation of crystals' (effluent from struvite separation step).

Without addition of alkaline substances, the pH of the treated water was maintained at 8.8~9.2 in the upper compartment and at 8.0~8.2 in the lower compartment of the crystallization tower. The reason for the difference of pH in the upper and lower portion of the compartment is thought to be due to the usage of carbonic acid ion in the process of crystallization of $CaCO_3$, $CuCO_3$, and $MgCO_3$, etc.

TABLE 1

[mg/L]

| Items | Before Anaerobic Treatment | After Anaerobic Treatment | After Separation of Crystals |
|---|---|---|---|
| CODcr | 31,000 | 11,000 | 9,800 |
| T-N | 3,800 | 2,150 | 1,648 |
| $NH_4$—N | 1,250 | 1,480 | 1,342 |
| T-P | 870 | 520 | 130 |

When compared to the statistics of 'after anaerobic treatment,' a 75% of T-P and a 9.3% of ammonium nitrogen were eliminated from the struvite separation step. Considering that the mole ratio of magnesium ion, ammonium ion, and phosphate ion is 1:1:1 for struvite, a 0.78 fold of the ammonium nitrogen has been removed.

After the completion of the above Execution Example 1, the pH of the lower crystallization reactor was increased to 9.4 by adding sodium hydroxide. However, the increasing effect of PH on the ammonium nitrogen elimination was meager (T-P; 76%, ammonium nitrogen; 9.4% were eliminated).

Example 2

This example was operated under the almost exact same conditions as in example 1. The same wastewater and facilities were used. The only difference was that magnesium containing compounds were injected to increase the magnesium ion concentration to a 200 mg/L (8.3 mmole/L). The experiment was operated continuously for a month. The average results from different effluents are shown in the table below. The maintained pH of the crystallization tank by carbon dioxide stripping without the injection of alkaline substance was 8.8~9.2 in the upper segment and 8.0~8.2 in the lower segment. This once again revealed that there is no need of alkaline substance injection.

TABLE 2

[mg/L]

| Items | Before Anaerobic Treatment | After Anaerobic Treatment | After Separation of Crystals |
|---|---|---|---|
| CODcr | 31,000 | 11,000 | 9,250 |
| T-N | 3,800 | 2,150 | 1,462 |
| $NH_4$—N | 1,250 | 1,480 | 1,300 |
| T-P | 870 | 520 | 12 |

By supplying magnesium ion in a concentration of 8.3 mmole/L, 97.7% of T-P and 2.2% of ammonium nitrogen was eliminated. A 12.9 mmole/L of ammonium nitrogen was eliminated, which is 1.54 folds of the injected magnesium ion. The elimination of additional ammonium nitrogen is thought to be due to other mechanisms such as stripping.

After the completion of the above Execution Example 2, the pH was increased to 9.6 by adding sodium hydroxide. However, the effect on the T-P and ammonium nitrogen elimination rate by the increase of pH levels by a 1.6 was meager (T-P; 97.8%, ammonium nitrogen; 12.2% were eliminated).

After discontinuing Mg supply, Ca ion at a concentration of 333 mg/L (8.3 mmole/L) were supplied. Compared with Mg supply case, the $NH_4$-N elimination rate decreased approximately 1% resulting in 11.2% and the T-P elimination rate remained similar with a 97.5%. It was identified that supplying Ca was as effective as supplying Mg.

Example 3

This example was operated under almost the same conditions as in examples 1 and 2. The same wastewater and facilities were used. Magnesium ion and phosphate ion were supplied in a concentration of 400 mg/L (100 mmole/L) and 3,100 mg/L (100 mmole/L) respectively for the removal of 1,300 mg/L (92.8 mmole/L) ammonium nitrogen. The experiment was operated continuously for a month with the theoretical mole ratio for struvite formation. The average results of several rounds of analysis are shown in the Table below. The maintained pH of the crystallization tank by carbon dioxide stripping without the injection of alkaline substance was 8.9~9.2 in the upper segment and 7.8~8.2 in the lower segment.

TABLE 3

[mg/L]

| Items | Before Anaerobic Treatment | After Anaerobic Treatment | After Separation of Crystals |
|---|---|---|---|
| CODcr | 31,000 | 11,000 | 7,400 |
| T-N | 3,800 | 2,150 | 212 |
| $NH_4$—N | 1,250 | 1,480 | 30 |
| T-P | 870 | 530 + 3,100 | 1< |

The T-P of the outflow water was below 1 mg/L (99.8%), while the ammonium nitrogen of the outflow water was maintained at 30 mg/L (98.0%). Therefore, the injection of alkaline substance for pH increase was omitted.

Additional removal of a considerate amount of organics was identified. Also, after 4 months of operation, the formed struvite crystals in floating form were 1~6mm in diameter, while the formed struvite crystals in attached form were 9~31 mm in diameter.

Example 4

This example was operated under the almost exact same conditions as in examples 1 and 2. However, a net-like structure was used in substitute of the stages of the stripping tower of 4 stages in order to increase the chance of stripping. With the net-like structure, a 4~6 cm high filter medium was set up inside each net-like structure within the stripping tower for efficient carbon dioxide stripping.

As in execution example 2, magnesium containing compounds were added to increase the magnesium ion concentration to 200 mg/L (8.3 mmole/L). The operation was carried out continuously for a month. The average results of several rounds of analysis are shown in the Table below. The maintained pH of the crystallization tank by carbon dioxide stripping without the injection of alkaline substance (pH 8.9~9.3 in the upper segment and pH 8.3~8.4 in the lower segment) was slightly increased compared to the results of example 2.

TABLE 4

| Items | After Anaerobic Treatment | After Separation of Crystals [Example 2] | After Separation of Crystals [Example 4] |
|---|---|---|---|
| CODcr | 11,000 | 9,250 | 8,990 |
| T-N | 2,150 | 1,462 | 1,112 |
| $NH_4$—N | 1,480 | 1,300 | 1,025 |
| T-P | 520 | 12 | 8 |

[mg/L]

According to the experiment results, the T-P elimination rate was slightly increased to 98.5% by supplying 8.3 mmole/L magnesium ions, but the ammonium nitrogen elimination rate was increased by 18.5%. In comparison to example 2, extra 275 mg/L ammonium nitrogen was removed resulting in an elimination of 30.7% of ammonium nitrogen which is in total 455 mg/L. This is thought to be due to the induced ammonia stripping by the increased stripping efficiency.

Namely, the improving of the carbon dioxide stripping method for MAP production makes possible the significant stripping of ammonia without additional injection of Mg ion or $PO_4$-P.

Also, the mole ratio for struvite formation is 0.254:1:0.504 because of the occurrence of ammonia stripping. This indicates that nitrogen removal efficiency can be increased by increasing ammonia stripping efficiency. The table below exhibits the eliminated moles of magnesium and phosphorus per 1 mol of eliminated nitrogen in execution example 1, 2, 3, and 4.

TABLE 5

| | Mg | Nitrogen | Phosphorus |
|---|---|---|---|
| Example 1 | 1.352 | 1 | 1.276 |
| Example 2 | 1.685 | 1 | 1.275 |
| Example 3 | 1.094 | 1 | 1.131 |
| Example 4 | 0.254 | 1 | 0.504 |

According to this struvite crystallization method for treating phosphorus and/or nitrogen containing wastewater, injection of alkaline substances is not necessary for struvite formation. More importantly, economical and efficient removal of nitrogen is possible because of ammonia stripping due to high pH levels. In addition, the struvite is formed in suspend solids forms and medium-attached forms.

What is claimed is:

1. A method of treating wastewater containing phosphorus and/or nitrogen for removing phosphorus and/or nitrogen from the wastewater, including following steps of:
    (a) introducing wastewater containing phosphorus and/or nitrogen into an anaerobic reactor, treating the introduced wastewater with anaerobic microorganisms, to produce biogas from organic matters in the wastewater, and then discharging the treated wastewater saturated with carbon dioxide under carbon dioxide partial pressure of 0.2 to 0.5 atm; and
    (b) introducing the treated wastewater of step (a) into a carbon dioxide stripping apparatus wherein the wastewater is free-fallen to expose the wastewater to ambient condition with carbon dioxide partial pressure of less than 0.001 atm so that carbon dioxide stripping takes place and increase in pH occurs, and then providing proper pH of 8.4 to 9.6 to form struvite,
    and at least one compound selected from the group consisting of magnesium containing compounds, phosphate containing compounds, and ammonium nitrogen are additionally injected before or during step (b).

2. The method according to claim 1, wherein ammonium nitrogen is eliminated by ammonia stripping from the carbon dioxide stripping apparatus in step (b).

3. The method according to claim 1, wherein the wastewater containing phosphorus and/or nitrogen is sewage.

4. The method according to claim 1, wherein the wastewater containing phosphorus and/or nitrogen is sewage sludge.

5. The method according to claim 1, wherein the carbon dioxide stripping apparatus is selected from the group consisting of scrubber, distillation column, stair-like aeration device, and modified facilities designed to make liquid and gas come into contact.

6. The method according to claim 1, further comprising the step of:
    (c) separating and collecting struvite from the wastewater of step (b) while discharging the wastewater through a solids separating arrangement.

7. The method according to claim 6, wherein the solids separating arrangement is selected from the group consisting of a precipitation tank, a flotation tank, a hydrocyclone, a decanter, a screen, and a membrane separation equipment.

8. The method according to claim 6, wherein all or a portion of the struvite-removed water is returned to the anaerobic reactor of step (a) so that ammonium nitrogen concentration of the anaerobic reactor of step (a) is maintained as 2,000 mg/L or below.

9. The method according to claim 6, further comprising the step of:
    (d) storing the wastewater of step (c) for usage as liquid fertilizer and/or additionally treating the wastewater of step (c) for discharge.

10. The method according to claim 1, wherein step (b) further comprises the step of adhering the formed struvite to filter medium.

11. The method according to claim 10, wherein the filter medium is one or more selected from the group consisting of natural filter medium, artificial filter medium, and calcium and/or magnesium ion supplying filter medium.

12. The method according to claim 1, further comprising a solid separating step before or after step (a).

13. The method according to claim 1, further comprising a solid separating step after step (a), wherein all or a portion of the struvite-removed water is returned to step (a).

14. The method according to claim 1, further comprising the step of injecting an alkaline substance into early-, mid- or late-stage of step (b).

15. The method according to claim 1, wherein the anaerobic reactor is selected from the group consisting of an anaerobic digester, an anaerobic contact processor, a fluidized bed reactor, an anaerobic filter, a hybrid anaerobic reactor, UASB (upflow anaerobic sludge blanket), EGSB (extended granule sludge bed), IC (internal circulation), and UASB+AF (anaerobic filter) hybrid reactor.

* * * * *